United States Patent [19]

Tanaka et al.

[11] Patent Number: 5,075,093
[45] Date of Patent: Dec. 24, 1991

[54] CALCIUM CARBONATE IN A PLATELET-LIKE PARTICULATE FORM AND A METHOD FOR THE PREPARATION THEREOF

[75] Inventors: Hiroichi Tanaka; Masanori Matsukawa; Akira Takeshi, all of Tokyo, Japan

[73] Assignee: Okutama Kogyo Kabushiki Kaisha, Tokyo, Japan

[21] Appl. No.: 596,402

[22] Filed: Oct. 3, 1990

Related U.S. Application Data

[63] Continuation of Ser. No. 527,637, May 23, 1990, abandoned, which is a continuation of Ser. No. 415,458, Oct. 2, 1989, abandoned, which is a continuation of Ser. No. 302,117, Jan. 24, 1989, abandoned, which is a continuation of Ser. No. 31,160, Mar. 25, 1987, abandoned, which is a continuation of Ser. No. 658,863, Oct. 9, 1984, abandoned.

[30] Foreign Application Priority Data

Oct. 18, 1983 [JP] Japan ................................ 58-193495

[51] Int. Cl.$^5$ ............................ C01F 5/24; C09C 1/02
[52] U.S. Cl. ................................. 423/432; 423/165; 106/464
[58] Field of Search ................... 423/430, 432, 165; 106/464

[56] References Cited

U.S. PATENT DOCUMENTS

| | | | |
|---|---|---|---|
| 1,163,475 | 12/1915 | Silberman | 423/165 |
| 2,141,458 | 12/1938 | Bates et al. | 423/432 |
| 2,292,503 | 8/1942 | Allen | 423/165 |
| 2,565,930 | 8/1951 | Rafton | 423/430 |
| 2,964,382 | 12/1960 | Hall, Jr. | 423/431 |
| 3,268,387 | 8/1966 | Casciani et al. | 423/432 |
| 3,320,026 | 5/1967 | Waldeck | 423/432 |
| 4,857,291 | 8/1989 | Ota et al. | 423/430 |

FOREIGN PATENT DOCUMENTS

| | | | |
|---|---|---|---|
| 46-5580 | 12/1971 | Japan | 423/432 |
| 54-130500 | 10/1979 | Japan | 423/432 |
| 323365 | 11/1972 | U.S.S.R. | 423/432 |
| 538990 | 1/1977 | U.S.S.R. | 423/430 |

*Primary Examiner*—Gary P. Straub
*Attorney, Agent, or Firm*—Wyatt, Gerber, Burke and Badie

[57] ABSTRACT

The invention provides a method for the preparation of a calcium carbonate powder of which the particles have a platelet-like particulate configuration and which is useful as a pigment or filler in various products with superiority to kaolin clays and mica powders. The method is a two-step carbonation method of a milk of lime of which the first step is performed by blowing carbon dioxide into the milk of lime until 10 to 70% of the calcium hydroxide is carbonated and the second step is performed by admixing the thus partially carbonated milk of lime with an aqueous carbonating solution containing an alkali metal carbonate or ammonium carbonate and an alkali metal hydroxide or ammonium hydroxide in specified concentrations to complete the carbonation of the calcium hydroxide. The first step carbonation is preferably preceded by a pretreatment of the milk of lime in which the milk of lime is subjected to shearing disintegration of the calcium hydroxide particles to cause a substantial increase of the viscosity up to a specified extent.

8 Claims, No Drawings

CALCIUM CARBONATE IN A PLATELET-LIKE PARTICULATE FORM AND A METHOD FOR THE PREPARATION THEREOF

This application is a continuation of Ser. No. 07/527,637, 05/23/90 abandoned. Which is a continuation of Ser. No. 07/415,458, 10/02/89 abandoned Which is a continuation of Ser. No. 07/302,117, 01/24/89 abandoned Which is a continuation of Ser. No. 07/031,160, 03/25/97 abandoned Which is a continuation of Ser. No. 07/658,863, 10/09/84 abandoned.

BACKGROUND OF THE INVENTION

The present invention relates to a calcium carbonate powder in a platelet-like particulate form and a method for the preparation thereof. More particularly, the invention relates to a powder of calcium carbonate of which each of the particles has a flat platelet-like configuration and a method for the preparation of such a powder of calcium carbonate by the synthetic method of the carbonation of a milk of lime.

Needless to say, the demand for natural and synthetic calcium carbonate powders is rapidly growing in recent years in various fields of industry including paper making, processing of rubbers and plastics, preparation of inks, paints and many other useful products by virtue of the excellent whiteness as a pigment and reinforcing effect as a filler to impart mechanical strengths and abrasion resistance to the above named materials.

As is known, powders of synthetic calcium carbonate are usually prepared by introducing carbon dioxide gas into a milk of lime to effect the reaction of calcium hydroxide and carbon dioxide precipitating calcium carbonate in a powdery form. The particulate configuration of the calcium carbonate powder obtained in such a method of carbonation of a milk of lime is usually spindle-like, cube-like or needle-like. Presumably this is the reason for the inferiority of conventional calcium carbonate powders in connection with the smoothness and luster of the surface and the mechanical strengths of the materials impregnated with the powder as a pigment or filler in comparison with kaolin clay, mica and other inorganic powders having a platelet-like particuLate configuration although calcium carbonate powders are preferred when in high whiteness and large ink absorption are desired. Accordingly, the application fields of the conventional calcium carbonate powders are under considerable limitations in this regard.

SUMMARY OF THE INVENTION

It is therefore an object of the present invention to provide a synthetic calcium carbonate powder of which the particles have a platelet-like particulate configuration to be capable of imparting excellent smoothness and luster of the surface as well as high mechanical strengths to the materials impregnated therewith in addition to the inherently good whiteness and large ink absorption and suitable as a white pigment or filler in papers, rubbers, plastics, inks, paints and the like even to exceed the performance of kaolin clays and mica powders.

Another object of the invention is to provide a method for the industrially advantageous method for the preparation of the above described calcium carbonate powder having the specific particulate configuration in a carbonation process of a milk of lime.

Thus, the method of the present invention for the preparation of a calcium carbonate powder having a platelet-like particulate configuration is a two-step carbonation method which comprises:

(a) a first step carbonation in which carbon dioxide gas or a gaseous mixture containing carbon dioxide is blown into a milk of lime to effect partial carbonation of from 10 to 70% of the calcium hydroxide contained in the starting milk of lime; and (b) a second step carbonation of the partially carbonated milk of lime obtained in the first step carbonation in which the partially carbonated milk of lime is admixed with an aqueous carbonate solution containing an alkali carbonate or ammonium carbonate having a controlled alkalinity by the addition of an alkali hydroxide or ammonia water in such an amount to complete the carbonation reaction of the calcium hydroxide in the milk of lime.

It has been unexpectedly discovered that the presence of a small amount of a magnesium compound in the milk of lime under the second step carbonation is effective in imparting the particles of the calcium carbonate powder formed in the milk of lime with a platelet-like particulate configuration by increasing the versatility in the reaction conditions.

DETAILED DESCRIPTION OF THE PREFERRED EMBODIMENTS

As is described above, the inventive method essentially comprises the two steps of carbonation and the omission of either one of the steps leads to the formation of a calcium carbonate powder having a spindle-like or cube-like particulate configuration or in an agglomerate form of very fine particles.

In carrying out the first step carbonation, a milk of lime, i.e. an aqueous dispersion of calcium hydroxide, is first prepared. The content of calcium hydroxide in the milk of lime should be in the range from 50 to 200 g/liter or, preferably, from 70 to 150 g/liter. When the calcium hydroxide content in the milk of lime is too low, no platelet-like particles of calcium carbonate can be formed and the resultant product is mainly composed of agglomerates of very fine spherical particles having a diameter of 0.1 μm or smaller. When the calcium hydroxide content in the milk of lime is too high, on the other hand, the consistency or viscosity of the slurried milk of lime is too high so that the carbonating gas can no longer be distributed uniformly throughout the whole volume even under vigorous agitation and the resultant calcium carbonate particles would have a fibrous configuration in an agglomerated form. This is particularly so when the conditioning pretreatment of the slurried milk of lime described below is undertaken to cause viscosity increase.

The introduction of the carbonating gas, i.e. carbon dioxide gas or a gaseous mixture containing carbon dioxide, into the milk of lime should be performed while the temperature of the milk of lime is controlled and maintained not to exceed 30° C. or, preferably, in the range from 8° to 20° C. A higher temperature may lead to the formation of agglomerates of spherical fine particles of 0.1 μm or smaller in diameter. When a carbon dioxide-containing gaseous mixture is used as the carbonating agent blown into the milk of lime, the concentration of the carbon dioxide in the gaseous mixture should be at least 5% by volume or, preferably, at least 15% by volume in order to avoid introduction of an excessively large volume of the carbonating gas into the milk of lime. The diluent gas in the carbonating gas is not particularly limitative provided that the gas is inert to the milk of lime and usually it can be air. The rate of introduction of the carbonating gas should be adequately controlled and the preferable rate is in the range from 1 to 20 liters as carbon dioxide at N.T.P. per minute per kg of the calcium hydroxide contained in the starting milk of lime. A rate of introduction of the carbonating gas lower than above is of course uneconomical while an excessively high rate is undesirable due to the formation of calcium carbonate in a fibrous form intermixed with the platelet-like particles. It is of course that the first step carbonation should be performed in a vessel equipped with a stirrer means to ensure uniform proceeding of the reaction throughout the whole volume of the reaction mixture.

As the carbonating gas is introduced into the milk of lime, the temperature of the milk is increased by the evolution of the heat of reaction between calcium hydroxide and carbon dioxide. It is essential in this case that the temperature of the reaction mixture should be controlled to avoid excessive increase, if necessary, by use of an outer cooling means. It is preferable that the temperature of the reaction mixture is controlled not to exceed 30° C. although a temperature increase up to 40° C. at least toward the end of the first step carbonation has no particular adverse influences on the particulate configuration of the calcium carbonate product. The reaction mixture after the partial carbonation is, needless to say, a mixed slurry of the calcium carbonate particles formed by the carbonation and the calcium hydroxide particles remaining unreacted. It is noted that the calcium carbonate particles formed in this partial carbonation already have a platelet-like particulate configuration. The introduction of the carbonating gas is terminated when the degree of carbonation, i.e. the percentage of the calcium hydroxide converted into calcium carbonate to the overall amount of the calcium hydroxide contained in the starting milk of lime, has reached from 10 to 70% or, preferably, from 40 to 60% as calculated from the overall volume of the introduced carbonating gas or the results of the chemical analysis of small portions of the reaction mixture taken periodically. When the degree of carbonation at the end of the first step carbonation is smaller than 10%, calcium carbonate formed in the second step carbonation would have a fibrous configuration in addition to the platelet-like particles while, when the first step carbonation is performed so far to exceed 70% of the degree of carbonation, the once formed platelet-like calcium carbonate particles may be transformed into cubic particles.

It is sometimes advantageous in order to obtain reliable and reproducible results of the preparation that the first step carbonation of the milk of lime is preceded by a pretreatment for conditioning in which the milk of lime is subjected to a shearing force in a mixer or homogenizer so that the calcium hydroxide particles are disintegrated to cause substantial increase in the viscosity or consistency of the milk of lime. The extent of such a conditioning pretreatment should be determined by taking the viscosity of the milk of lime as a measure. Thus, the pretreatment should be continued until the milk of lime, when prepared to have a calcium hydroxide content of 400 g/liter, has a viscosity in the range from 80 to 5000 centipoise or, preferably, from 100 to 1500 centipoise at 25° C. as determined by use of a Brookfield-type viscosimeter with a No. 3 or No. 4 rotor rotating at 60 rpm. When the extent of this pretreatment is insufficient, the milk of lime may contain certain amount of agglomerated calcium hydroxide particles left without disintegration while an excessive extent of the pretreatment is undesirable, in addition to the uneconomically long time taken for the pretreatment, because no platelet-like calcium carbonate particles are formed in the first step carbonation to follow.

Following the completion of the above described first step carbonation, the partially carbonated milk of lime is admixed with an aqueous carbonating solution to effect the second step carbonation, in which carbonation of the remaining calcium hydroxide takes place instantaneously in the vicinity of the platelet-like particles of calcium carbonate already formed in the first step carbonation as the nuclei to complete the carbonation reaction without transformation of the platelet-like particulate configuration.

The aqueous carbonating solution is an aqueous solution of an alkali metal carbonate or ammonium carbonate having controlled alkalinity by the addition of an alkali metal hydroxide or ammonia water, i.e. ammonium hydroxide. The alkali metal carbonate may be sodium carbonate or potassium carbonate and the alkali metal hydroxide may be sodium hydroxide or potassium hydroxide. It should be noted that a combination of an alkali metal carbonate and ammonia and a combination of ammonium carbonate and an alkali metal hydroxide are undesirable although sodium and potassium compounds are replaceable with each other. The concentration of the carbonate in the aqueous carbonating solution should be in the range from 0.1 to 2.0 moles/liter or, preferably, from 0.5 to 2.0 moles/liter since an excessively high concentration thereof may cause a difficulty in controlling the temperature of the reaction mixture as a result of vigorous evolution of heat of reaction. The concentration of the hydroxide, i.e. the alkali metal hydroxide or ammonium hydroxide, should be in the range from 0.1 to 5.0 moles/liter or, preferably, from 0.5 to 4.0 moles/liter while it is preferable that the molar concentration of the hydroxide is at least one tenth of that of the carbonate. When the concentration of the hydroxide is lower than 0.1 mole/liter, the resultant calcium carbonate powder may take a cubic or spindle-like particulate configuration. It is also desirable that the molar ratio of the hydroxide to the remaining calcium hydroxide in the partially carbonated milk of lime should be at least equimolar. Needless to say, the overall amount of the carbonate in the aqueous carbonating solution should be sufficiently large to ensure complete carbonation of the remaining calcium hydroxide in the milk of lime after the partial carbonation in the first step. In other words, the amount of the carbonate should be at least equimolar to the remaining calcium hydroxide to be carbonated as a matter of course.

The partially carbonated milk of lime after the first step carbonation can be used usually as such in this second step carbonation although the solid content therein should not exceed 60% by weight in any way. Thus, the partially carbonated milk of lime in a vessel equipped with a powerful stirrer means is kept at a temperature of 30° C. or below or, preferably, 20° C. or below and admixed under vigorous agitation with the aqueous carbonating solution which is also kept at 30° C. or below or, preferably, 20° C. or below. When the temperature of the reaction mixture exceeds the above given upper limit, the resultant calcium carbonate powder may have a cubic or spindle-like particulate configuration. The reaction, like other ionic reactions in general, is completed instantaneously in principle although, practically, it is sometimes necessary to continue the agitation for a minute or longer depending on the volume of the reaction mixture and the efficiency of agitation. Meanwhile, no particular difference was noted in the results depending on the manner of admixture of the aqueous carbonating solution and the partially carbonated milk of lime which can be the addition of the former to the latter or vice versa.

In the course of the investigations to determine the preferable conditions in the second step carbonation, it has been unexpectedly discovered that the presence of a magnesium compound in the reaction mixture plays an important role for the stabilization of the platelet-like particulate configuration of the resultant calcium carbonate particles and the effective content of the magnesium compound in the partially carbonated milk of lime is in the range from 0.005 to 0.1 mole or, preferably, from 0.01 to 0.04 mole per mole of the calcium compound, i.e. the calcium carbonate and the unreacted calcium hydroxide, therein. It is, however, not always necessary to intentionally add a magnesium compound into the reaction mixture since any calcium hydroxide product used as the starting material usually contains a magnesium impurity more or less. Therefore, intentional addition of a magnesium compound to the partially carbonated milk of lime should be undertaken only when the starting calcium hydroxide is deficient in the level of the magnesium impurity. The type of the magnesium compound is not particularly limitative including oxide, hydroxide and salts with inorganic and organic acids. By virtue of the stabilizing effect on the platelet-like particulate configuration of the calcium carbonate, the requirement for the temperature control in the second step carbonation can be mitigated by the presence of a magnesium compound in the reaction mixture. For example, the reaction temperature can be close to 30° C. in the presence of a magnesium compound while, in the absence or deficiency of a magnesium compound, a small but not negligible amount of agglomerates of very fine calcium carbonate particles is formed in the reaction mixture when the temperature exceeds 25° C.

The calcium carbonate particles prepared in the above described manner have a platelet-like particulate configuration with a thickness from about 0.1 to 0.3 $\mu$m and a dimension within the plane of the platelet from 0.5 to 2 $\mu$m and the products are very useful in various applications as a pigment or filler. Such a powdery calcium carbonate product is not known in the prior art.

In the following, the method of the present invention is described in more detail by way of examples. The aqueous carbonating solutions used in the examples were prepared by using a commercial ammonium carbonate reagent corresponding to the chemical formula of $NH_4HCO_3.NH_2CO_2NH_4$ or hydrated sodium or potassium carbonate of the formula $Na_2CO_3.H_2O$ or $K_2CO_3.2H_2O$.

EXAMPLE 1

An aqueous calcium hydroxide slurry containing 410 g/liter of solid was prepared which had a viscosity of 52 centipoise at 25° C. as determined by using a Brookfield viscosimeter with the No. 3 rotor rotating at a velocity of 60 rpm when diluted to a solid content of 400 g/liter and 10 liters of the slurry were subjected to shearing disintegration in a homomixer for 20 minutes. The viscosity of the aqueous slurry after this pretreatment was about 1000 centipoise at 25° C. as determined under the same conditions as above when diluted to a solid content of 400 g/liter.

The thus pretreated aqueous slurry of calcium hydroxide, i.e. milk of lime, was diluted with water to have a solid content of 97 g/liter and 10.0 liters thereof were introduced into a reaction vessel equipped with a stirrer and provided with a cooling means. The temperature of the slurry was decreased to 9° C. Into the thus chilled milk of lime under agitation was blown a carbonating gas which was a mixture of carbon dioxide and air containing 30% by volume of the former at such a rate that 10N liters of carbon dioxide were introduced per minute per kg of the calcium hydroxide initially contained in the milk of lime until the degree of carbonation had reached 48%. The temperature of the reaction mixture was controlled not to exceed 25° C. throughout by operating the cooling means. The electron microscopic inspection of the thus partially carbonated milk of lime indicated the formation of small platelet-like particles intermixed with the calcium hydroxide particles.

Separately, an aqueous carbonating solution was prepared by mixing 17.1 liters of a 0.20 mole/liter aqueous solution of sodium carbonate and 2.5 liters of a 2N aqueous solution of sodium hydroxide and the solution was chilled to a temperature of 6° C. Into the carbonating solution kept at the temperature were poured at one time 5 liters of the partially carbonated milk of lime also kept at 6° C. under vigorous agitation which was continued for further 30 minutes to complete the reaction of carbonation followed by filtration. The wet cake was repeatedly washed with water to substantial neutrality and the water content in the wet cake after the final washing was replaced with acetone followed by drying in an oven at 110° C. and disintegration of the dried cake into a fine powder.

The particles of the thus prepared calcium carbonate powder had a platelet-like particulate configuration with a thickness from about 0.1 to about 0.2 $\mu$m and a dimension within the plane from about 0.5 to about 1.5 $\mu$m as indicated by the electron microscopic inspection.

EXAMPLE 2

An aqueous carbonating solution was prepared by mixing 3.5 liters of an aqueous solution of ammonium carbonate in a concentration of 1.0 mole/liter and 1.3 liters of ammonia water in a concentration of 28% by weight and the solution was kept at 14° C. A partially carbonated milk of lime was prepared in a similar manner to Example 1 and 5 liters thereof kept at 16° C. with admixture of 13.8 g of magnesium chloride were poured at one time into the above prepared aqueous carbonating solution under vigorous agitation which was continued for further 5 minutes to complete the carbonation reaction followed by filtration, washing with water, drying and disintegration undertaken in the same manner as in Example 1 to give a powdery calcium carbonate product.

The particles of the thus prepared calcium carbonate powder had a platelet-like particulate configuration with a thickness from about 0.1 to about 0.2 $\mu$m and a dimension within the plane from about 0.5 to about 1.5 $\mu$m.

EXAMPLES 3 to 11

The experimental procedure was substantially the same as in Example 1 including the step of the pretreatment of the milk of lime, the first step carbonation and the second step carbonation although the detailed conditions were varied from experiment to experiment as indicated in Table 1 below. In each of the Examples, the first step carbonation was performed using 10 liters of the milk of lime after the pretreatment and the second step carbonation was performed using 5 liters of the partially carbonated milk of lime after the first step carbonation.

The calcium carbonate product obtained in each of the Examples had a platelet-like particulate configuration although agglomerates of very fine spherical particles were contained in the product obtained in Examples 8 to 10 and cubic particles were contained in the product obtained in Example 11.

taining an alkali metal carbonate or ammonium carbonate together with an alkali metal hydroxide or ammonium hydroxide, the concentration of the carbonate in the aqueous carbonating solution being from 0.1 to 2.0 moles/liter and the concentration of alkali metal hydroxide or ammonium hydroxide in the aqueous carbonating solution being from 0.1 to 5.0 moles/liter.

2. The method as claimed in claim 1 wherein the slurry in step (c) is adjusted to contain from 70 to 150 g/liter of calcium hydroxide.

3. The method as claimed in claim 1 wherein the carbonating gas contains at least 15% by volume of carbon dioxide.

4. The method as claimed in claim 1 wherein the rate

TABLE 1

| Example No. | Pretreatment | | | First-step carbonation | | | | Second step carbonation Carbonate solution | | |
|---|---|---|---|---|---|---|---|---|---|---|
| | $Ca(OH)_2$ content, g/liter | Viscosity at 25° C. as 400 g$Ca(OH)_2$/liter, centipoise | | $Ca(OH)_2$ content, g/liter | Starting temperature, °C. | Rate of $CO_2$ introduction, Nl/kg$Ca(OH)_2$·minute | Concentration of $CO_2$, % by volume | Final degree of carbonation, % | Carbonate | Concentration, moles/l | Volume, liters |
| | | Before treatment | After treatment | | | | | | | | |
| 3 | 450 | 48 | 250 | 65 | 9 | 7 | 20 | 45 | Sodium | 0.6 | 4.1 |
| 4 | 260 | 51 | 700 | 152 | 11 | 15 | 35 | 56 | Sodium | 1.9 | 2.5 |
| 5 | 300 | 51 | 1300 | 115 | 14 | 12 | 30 | 51 | Ammonium | 0.8 | 4.8 |
| 6 | 480 | 45 | 550 | 98 | 10 | 10 | 28 | 48 | Potassium | 1.2 | 2.9 |
| 7 | 420 | 59 | 500 | 110 | 10 | 8 | 29 | 52 | Potassium | 0.6 | 11.0 |
| 8 | 420 | 60 | 7000 | 105 | 10 | 10 | 29 | 50 | Sodium | 0.5 | 7.1 |
| 9 | 380 | 48 | 1000 | 97 | 9 | 10 | 30 | 48 | Ammonium | 0.2 | 17.1 |
| 10 | 410 | 55 | 1300 | 115 | 14 | 12 | 30 | 51 | Ammonium | 0.8 | 4.8 |
| 11 | 440 | 45 | 700 | 152 | 11 | 15 | 35 | 56 | Sodium | 1.5 | 3.1 |

| Example No. | Second step carbonation | | | | | | |
|---|---|---|---|---|---|---|---|
| | Alkaline hydroxide solution | | | Temperature, °C., of | | Magnesium doping | |
| | Hydroxide | Concentration | Volume, liters | Carbonating solution | Milk of lime | Compound | Amount added, g |
| 3 | NaOH | 2N | 1.5 | 8 | 11 | $Mg(OH)_2$ | 10 |
| 4 | NaOH | 2N | 2.5 | 20 | 21 | — | — |
| 5 | $NH_4OH$ | 28% | 2.0 | 30 | 30 | $Mg(NO_3)_2$ | 39 |
| 6 | KOH | 2N | 2.0 | 10 | 11 | — | — |
| 7 | KOH | 2N | 2.5 | 15 | 17 | — | — |
| 8 | NaOH | 2N | 2.1 | 15 | 15 | — | — |
| 9 | $NH_4OH$ | 28% | 2.3 | 30 | 30 | — | — |
| 10 | $NH_4OH$ | 28% | 2.0 | 35 | 35 | $Mg(NO_3)_2$ | 39 |
| 11 | NaOH | 2N | 1.1 | 13 | 13 | — | — |

What is claimed is:

1. A method for the preparation of calcium carbonate which comprises the successive steps of:
   a: preparing a calcium hydroxide slurry having a calcium hydroxide content of 260 to 480 g/liter,
   b: subjecting the slurry to shearing disintegration of the calcium hydroxide particles to such an extent that the viscosity of the slurry is from 80 to 5000 centipoise at 25° C. as measured by a Brookfield viscosimeter with a number 3 or number 4 rotor rotating at a velocity of 60 rpm, for the slurry in which the calcium hydroxide content is adjusted to 400 g/liter,
   c: adjusting the calcium hydroxide content of said slurry to 50 to 200 g/liter,
   d: carbonating the slurry from step c by directly introducing a carbonating gas which is carbon dioxide into the slurry while controlling the temperature of the slurry at 40° C. or less to carbonate from 10 to 70% of the calcium hydroxide contained in the slurry, and
   e: directly carbonating the resulting slurry at a temperature not exceeding 30° C. by admixing the slurry with an aqueous carbonating solution conof introduction of the carbonating gas into the milk of lime is in the range from 1 to 20 liters of carbon dioxide per kg of the calcium hydroxide contained in the milk of lime per minute as calculated at 0° C. and under 1 atmosphere.

5. The method as claimed in claim 1 wherein the aqueous carbonating solution contains from 0.5 to 2.0 moles/liter of the carbonate.

6. The method as claimed in claim 1 wherein the second step carbonation is performed at a temperature of 20° C. or below.

7. The method as claimed in claim 1 wherein the partially carbonated milk of lime in the second step carbonation is admixed with a magnesium compound in such an amount that the milk of lime contains from 0.005 to 0.1 mole of magnesium per mole of the calcium compound therein.

8. The method as claimed in claim 1 wherein a product having a platelet-like particle configuration comprises a thickness in the range of 0.1 to 0.3 μm and dimensions within the plane of the platelet from 0.5 to 2 μm is produced.

* * * * *